United States Patent [19]
Lauer et al.

[11] 3,977,444
[45] Aug. 31, 1976

[54] APPARATUS AND METHOD FOR DEVELOPING WOUND COILS FOR ELECTROMAGNETIC DEVICES AND FOR INTERDEPENDENTLY CONDITIONING WINDING APPARATUS AND COIL PLACING APPARATUS

[75] Inventors: Richard E. Lauer; Louis W. Pieper, both of Fort Wayne, Ind.

[73] Assignee: General Electric Company, Fort Wayne, Ind.

[22] Filed: Jan. 7, 1975

[21] Appl. No.: 539,135

Related U.S. Application Data

[63] Continuation of Ser. No. 452,419, March 18, 1974, abandoned.

[52] U.S. Cl.............................. 140/92.1; 29/205 D
[51] Int. Cl.²........................................... B21F 3/00
[58] Field of Search..................... 140/1, 92.1, 92.2; 29/205, 596

[56] References Cited
UNITED STATES PATENTS

| | | | |
|---|---|---|---|
| 2,143,315 | 1/1939 | Hanson | 140/92.2 |
| 2,514,251 | 7/1950 | Moore et al. | 140/92.2 |
| 3,557,432 | 1/1971 | Pavesi | 29/596 |
| 3,579,791 | 5/1971 | Arnold | 140/92.1 |
| 3,742,596 | 7/1973 | Smith et al. | 140/92.1 |
| 3,866,847 | 2/1975 | Droll | 140/92.2 |

*Primary Examiner*—Lowell A. Larson
*Attorney, Agent, or Firm*—Ralph E. Krisher, Jr.

[57] ABSTRACT

Methods and apparatus for selecting increments of relative travel of portions of at least one coil insertion apparatus in response to the actual height of a selected magnetic core and interdependently adjusting the mechanical interrelationships between two or more parts of winding turn establishing means of winding apparatus so as to provide one or more turns of conductive material having a size and shape that is particularly adapted for placement in slots of the selected magnetic core. During the interdependent adjustment, one or more additional coil insertion apparatus may be interdependently adjusted. In one approach, a gauge measures actual axial length of core and mechanism concurrently sets up winding size determining means. The gauge may be coil insertion apparatus.

Also disclosed are apparatus and methods for: adjusting winding turn size (this being related to stack height); for adjusting the "span" of winding turns so that they may selectively be of "odd" or "even" span; and for selectively determining relative angular indexing of winding turn receiving means so that the polar axes of adjacent coil groups may be angularly displaced substantially any desired amount. Winding apparatus includes winding turn size determining means that are made up of a plurality of parts, at least some of which are movable relative to one another so as to provide winding turns of a desired span and size.

21 Claims, 18 Drawing Figures

APPARATUS AND METHOD FOR DEVELOPING WOUND COILS FOR ELECTROMAGNETIC DEVICES AND FOR INTERDEPENDENTLY CONDITIONING WINDING APPARATUS AND COIL PLACING APPARATUS

This is a continuation of application Ser. No. 452,419, filed Mar. 18, 1974, now abandoned.

CROSS-REFERENCE TO RELATED APPLICATIONS AND PATENT

Our co-pending application Ser. No. 276,789, now U.S. Pat. No. 3,829,953, which was filed on July 31, 1972 (as a continuation-in-part of Ser. No. 126,077 of Mar. 19, 1971 and now abandoned) is a related application. Also related is Dallas Smith U.S. Pat. No. 3,698,063 which issued Oct. 17, 1972. The entire disclosures of this co-pending application and the just mentioned patent are specifically incorporated herein by reference. Also related is Lauer U.S. Pat. No. 3,765,080 which issued Oct. 16, 1973, and to which reference is made, for incorporation herein, of background information. The just-referred to applications and patents all are assigned to the assignee of this application.

BACKGROUND OF THE INVENTION

This invention relates generally to improved processes and apparatus for developing and handling wound coils for use in electromagnetic devices and, more particularly, to new and improved apparatus and methods that are of particular value when machine set-up changes should be effected so as to produce inductive devices having differing design specifications.

The present invention also relates to improved apparatus and methods for interdependently conditioning winding turn generating apparatus and winding turn placing apparatus, so that such apparatus may be readily and quickly utilized in the production of wound electromagnetic devices of differing designs.

Apparatus and methods for developing wound coils for use in electromagnetic devices, and particularly for dynamoelectric machines (e.g. electric motors) are highly developed in the art, as are equipment and processes for axially placing or injecting prewound coils into the slots of magnetic cores. Cutler et al. U.S. Pat. No. Re. 27,415 and Lauer U.S. Pat. No. 3,765,080 are two patents that represent the state of development (as of their respective filing dates) of the winding equipment and winding method art. Methods that are of particular use for axially inserting coils in magnetic cores are exemplified, for example, in the expired A. P. Adamson U.S. Pat. No. 3,432,267; Hill U.S. Pat. No. 3,508,316; and Arnold U.S. Pat. No. 3,722,063.

Particularly significant advances in the coil placing art are represented in the previously referenced co-pending application and Smith U.S. Pat. No. 3,698,063. For example, when following the teachings presented therein, quick and easy changes in set-up of coil placing equipment may be effected. As pointed out in the above-referenced co-pending application and patent, the types of equipment that were known long prior to the present application required the extensive utilization of labor to make equipment changes (when such changes were feasible at all) in order to accommodate changes in the axial height of the core.

Efforts also have been made to provide winding forms (sometimes also called winding molds) which could be adjusted so as to provide windings (composed of one or more coils each having one or more turns) of conductive material that could be placed into cores of different axial heights. Arnold U.S. Pat. No. 3,672,027 (issued June 27, 1972), for example, teaches how this may be accomplished. However, it has continued to be necessary to independently adjust or change the set-up of both winding coil producing equipment and coil placing equipment. It thus will be understood that it would be particularly desirable to provide means and methods for interdependently conditioning winding coil producing equipment and winding coil placing equipment so that winding coils for cores of different axial lengths may be expeditiously produced and placed on such cores.

As above noted, prior winding equipment has been provided with means for adjusting the size of coils (i.e., the mean turn length or turn circumference) so as to permit the production of coils for cores of differing stack heights. However, problems associated with changing the "span of wound coils" have not been solved. Heretofore, it has been necessary to actually use a first set of winding "forms" or "molds" in order to produce coils that would span an "even" number of core teeth and then use a second set of forms or molds in order to produce coils that would span an "odd" number of core teeth. Accordingly, it would be desirable to provide means and methods whereby winding coils of both even and odd span could be produced with a single set of turn establishing means (e.g., a single form or mold set).

In order to better explain the reason for the odd or even "span" problem, it is noted that cores for motors, for example, may be designed to have a given stack height, a give bore, and a given number of "slots" or "teeth". It may be desired to place windings in these slots that will provide two different operational speeds, or to make one set of motors to operate at a first speed and a second set of motors to operate at a second, different speed.

For example, a motor having a stator core with 36 teeth (and thus 36 winding accommodating slots) may be provided with both a four-pole main winding and an eight-pole main winding. In a situation such as this, the eight pole main winding may be made up of some coil groups which have at least one coil spanning an odd number of core teeth, and some coil groups which have at least one coil that spans an even number of core teeth. When teachings of the present application are utilized, successive "odd span" and "even span" coil groups may be produced on a given piece of winding equipment in a rapid and efficient manner.

SUMMARY OF THE INVENTION

Accordingly, it is a general object of the present invention to provide new and improved methods for developing wound coils for electromagnetic devices.

Another object of the present invention is to provide new and improved apparatus and methods for developing or producing successive coil groups that include coils of even span as well as odd span.

Still another object of the present invention is to provide winding producing equipment and winding placing equipment that may be conditioned interdependently so that winding turns may be selectively produced or developed and then quickly placed in slots of a magnetic core having a selected height or length within a range of such heights or lengths.

Yet another object of the present invention is to provide new and improved methods and devices for interdependently conditioning (for example, changing at least one machine set-up) coil winding equipment and coil placing equipment when one or more wound coils are to be produced for a particular design of a dynamoelectric machine.

A still further object of the present invention is to provide new and improved methods and apparatus for developing or producing various coils that may be of odd or even span and that are to be ultimately placed in slots of a core so as to establish adjacent polar axes that are angularly displaced, relative to one another, in substantially any manner desired or required for a given design of a selected dynamoelectric machine.

In carrying out the above and other objects, in one preferred form, we provide improved methods and apparatus for selecting increments of relative travel of portions of at least one coil insertion apparatus in response to the actual height of a selected magnetic core and interdependently adjust the mechanical interrelationships between two or more parts of winding turn establishing means so as to provide one or more turns of conductive material having a size and shape that is particularly adapted for placement in slots of the selected magnetic core. When making such interdependent adjustment, one or more additional pieces of coil insertion equipment may be interdependently and concurrently adjusted also.

In one approach, coil insertion apparatus is quickly adjusted for use with a core of a given core height and such apparatus is used as a gage for making an adjustment in winding equipment and/or other insertion apparatus. To illustrate this approach and apparatus for practicing the same, we have illustrated herein one form of apparatus that includes means for selectively operatively interconnecting coil injection equipment and winding equipment. With this form of apparatus, when changes are made in one piece of equipment (in order to make the equipment properly useable with a core of a predetermined height), another piece of equipment has parts therein relatively repositioned so as to also be properly useable for such core.

In connection with an illustrated form of winding equipment, we provide apparatus and methods for: adjusting winding turn size (this being related to stack height); for adjusting the span of winding turns so that they may selectively be of odd or even span; and for selectively determining relative angular indexing of winding turn receiving means so that the polar axes of adjacent coil groups may be angularly displaced substantially any desired amount.

The subject matter which is regarded as our invention is particularly pointed out and distinctly claimed in the concluding portion of the specification. The invention itself, however, together with further objects and advantages thereof, may be best understood by reference to following description taken in conjunction with the accompanying drawings wherein like reference numerals have been utilized to denote like parts.

DESCRIPTION OF THE PREFERRED EMBODIMENTS

Figure 1:
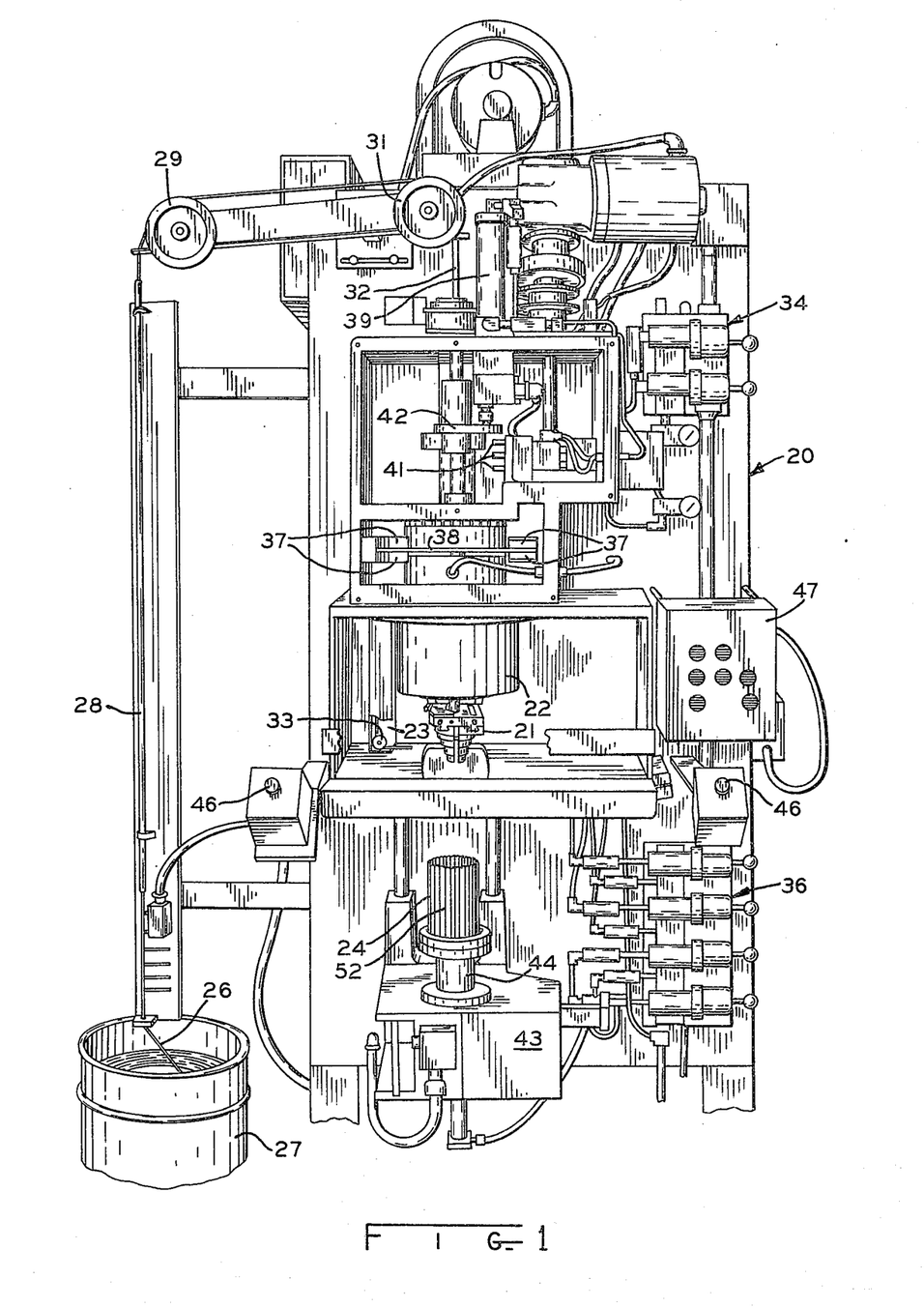
FIG. 1 is a front pictorial view of winding apparatus embodying inventive features of ours, in one preferred form.

Referring now to FIG. 1, we have illustrated winding apparatus 20 that embodies inventive aspects in one form and which may be used to practice aspects of our invention. Apparatus 20 includes a winding turn generating assembly that is revealed as including turn size and shape determining means - illustrated as a turn/coil former 21 and wire dispensing means shown as including a flyer drum 22 and flyer arm 23.

During operation of apparatus 20 in a wind and shed manner, coil receiving means, shown as magazine 24, receives winding turns as they are shed from turn former 21. As such turns are being shed, still one or more other turns are being formed by turn former 21, all as will be understood by persons skilled in the art. It should be specifically noted, however that our invention may be embodied in, and practiced with, other types of winding equipment (e.g., winding equipment wherein multi-turn coils are wound on a mold or form and then moved away on a winding turn receiver — sometimes after collapsing parts of the mold or form to reduce tension on the wire).

A brief description of the operation of apparatus 20 will now be presented, but only for purposes of illustration. Wire 26 is supplied from wire supply 27 along guides such as tube 28, pulleys 29, 31, and tube 32, to flyer arm 23 and pulley 33. As the flyer arm 23 rotates with drum 22, wire is wrapped about segments of turn former 21 that are aligned with the plan of revolution of the wire feeding part of pulley 33.

In initially preparing apparatus 20 for operation, the control device for the apparatus is set in order to program the apparatus for a desired winding sequence or mode of operation. This control device may be built into apparatus 20 and be covered by a rear panel, or it may be a more remotely located device such as a computer. If the latter, programming may be accomplished with punched cards or tape, or magnetic tape or discs, or any other approach used with the particular computer chosen for use. If the former, a series of counters or switches on a control panel may be set. The counters and switches then would insure that coil groups for two pole, four pole, six pole, eight pole, etc., winding arrangements would be formed; and that each coil group would have a desired number of coils per coil group and winding turns per coil. This is assuming, of course, that the winding equipment is capable of use in the production of windings for dynamoelectric machines of the selected number of winding poles. The setting of switches or counters also would determine the number of blade units or angle through which magazine 24 will index after each coil group is formed, and also whether such coil group would be of even or odd span, as discussed in more detail hereinafter.

It will be understood that during operation of apparatus 20 respective cylinders in cylinder banks 34, 36 may be used to control: the action of brake pads 37 on brake disc 38; the operation of jump cylinder 39; the particular one of interposer pins or steps 41 that will be positioned to stop jump mechanism drive plate 42; the movement of base 43 which moves pedestal 44 up and down so that magazine 24 may receive winding turns or may be indexed or removed from apparatus 20, and so forth. Of course, each cycle of operation of apparatus 20 will be initiated by simultaneous depression of start buttons 46, while panel 47 may be used to indicate (by lights or switch position) whether power is on, and malfunctions or apparatus 20.

Figure 2:
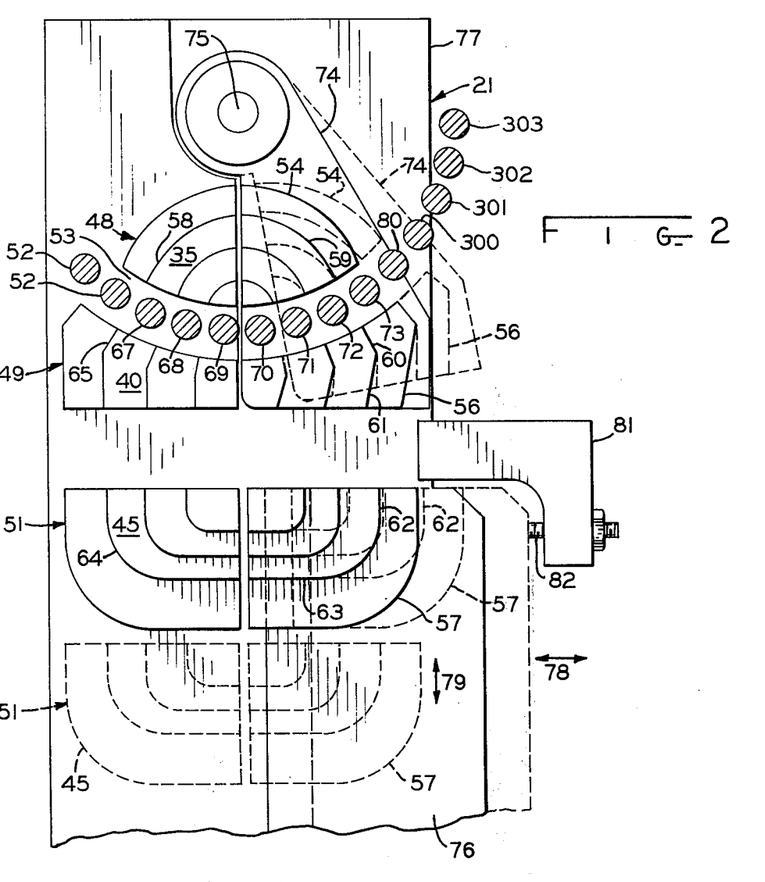
FIG. 2 is a bottom plan view (with parts removed, parts in section, and parts broken away) of winding turn formation means and winding turn receiver parts shown in the apparatus of FIG. 1.

Turning now to FIGS. 2, and 4–6, the turn former 21 will be described in more detail. With reference first to FIG 2, turn former 21 includes three main turn forming sections 48, 49, 51. Each of these sections 48, 49, 51 comprise at least two relatively movable parts or subsections that are selectively movable so as to permit the development or generation of turns of even as well as odd span. Each of these sections also include subsections or parts 35, 40, 45. The parts 35 and 40 are fixed in position, whereas part 45 is movable during adjustments that are explained hereinafter.

It will be noted from FIG. 2 that blades 52 (also referred to as "pins" or "fingers" in the art) are disposed at spaced apart regions that lie along an arcuately extending gap 53. The gap 53 is defined by turn former sections 48, 49. When parts or subsections 54, 56, 57 are in the solid line positions thereof as shown in FIG. 2, winding turns will be developed that will span an even number of blades 52. For example, the six blades 67–72 will be spanned when a winding turn is generated generally along the lines 58, 59, 60, 61, 62, 63, 64, and 65. However, when the turn former sections 54 and 56 are moved to the dotted line position thereof shown in FIG. 2 (it being noted that turn former section 57 will also be moved to a dotted line position thereof), a winding turn generated along the same lines 58–65 of the forms will span an odd number of blades, i.e., the blades 67–73 and blade 80 (a total of seven blades).

The precise manner in which the relative positions of the different subsections or parts of the turn formers are moved, is described in more detail hereinafter in conjunction with FIGS. 4–11, but it first is here noted that the parts 54 and 56 are both mounted on a swing plate 74, which plate pivots about a pivot pin 75. Moreover, the part 57 is movable in one direction by moving a slide plate 76.

By way of initial and general description of the assembly 21 shown in FIG. 2, it is noted that a base plate 77 is provided to which the parts 35 and 40 are fastened by screws or any other suitable means. The part 45 on the other hand is free to be moved in continuous fashion between two extreme positions thereof (one such position being indicated by solid lines and the other extreme position being indicated by dotted lines in FIG. 2). This movement of the part 51 is effected to provide turns of larger or smaller sizes, as the case may be, that will correspond with a given core axial height or length. The part 57, as previously noted, is mounted for movement along the direction line of arrow 78 in FIG. 2 in response to corresponding movement of the slide plate 76. Moreover, part 57 is movable along the direction line of arrow 79 at the same time that part 45 is moved so as to correspond to various axial core lengths. In order to limit the extreme position of travel of the part 57 in one direction along arrow 78, we have provided limiting or stop means that include a stop arm 81 which carries an adjusting screw 82. This screw may be adjusted to precisely determine the stop position of turn former part 57.

It should be understood that separate drive means could be utilized to synchronize movement of the various subsections or parts of the turn former sections, and that if desired, the swing plate 74 could be powered by rotating the shaft or pivot pin 75 by some suitable power drive or connecting member. However, in the embodiment now to be described, only the turn former parts 45 and 57 are directly driven, and an interconnecting member between the slide plate 76 is utilized to swing part 56 (and through part 56 the swing plate 74) to different desired positions thereof.

Figure 3:
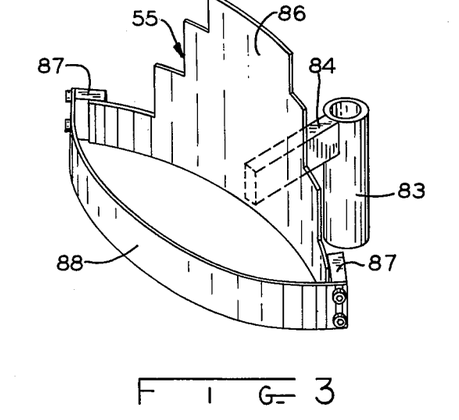
FIG. 3 is a pictorial view of what is known as a turn pusher or turn stripper that is used in conjunction with the parts shown in FIG. 1.

Before commencing with a description of FIGS. 4–10, reference now is made to FIG. 3 wherein a stripper or wire pusher assembly 55 is shown. The pusher 55 is substantially similar to pushers utilized in the art and represented for example in the above incorporated by reference Lauer patent. FIG. 3 is presented herein only for purposes of completeness of illustration, and pusher 55 includes a drive rod 83, connecting bar 84, body 86, spacer blocks 87, and strap 88. It will be understood that when coil former 81 is advanced relative to the flyer (see FIG. 1) so that winding turns of different sizes may be formed, the pusher assembly 55 is moved so as to insure that all winding turns of a given size will be completely shed into gaps between appropriate ones of the blades 52.

Referring now collectively to FIGS. 4–10, it is noted that the base plate 77 includes a dove tail track section 89 which is essentially complementary to a dove tail groove 90 formed in the body of winding form part 45. The groove 90 in the winding form is large enough to also accommodate a jib 91 which is fastened to the form and which may be replaced or shimmed from time to time to insure a tight but sliding fit of the form part 45 along the track section 89. In like fashion, a track 92 is formed in slide plate 76 and form part 57 is provided with a complementary track receiving passage 93 dimensioned so that, with a properly sized jib 94 (carried by form part 57), form part 57 may move with a tight slide fit along the track 92.

Movement of the form part 45 and 57 along the tracks 89, 92 is accomplished by turning a stack height adjusting screw 96 which is threadably received in a control block or drive nut 97. The screw 96 is free to turn in bushing 98 (see FIG. 8) whereas drive nut 97 is constrained from rotation relative to base plate 77 but is free to move axially along a slot 99 formed therein. The drive nut 97 includes a drive pin 100 which is received in a corresponding hole 101 that is formed in the form part 45. During rotation of the adjusting screw 96, drive block or nut 97 will move in the slot 99 and cause the form part 45 to move along the dove tail track 89 of the base plate 77.

Figure 10:
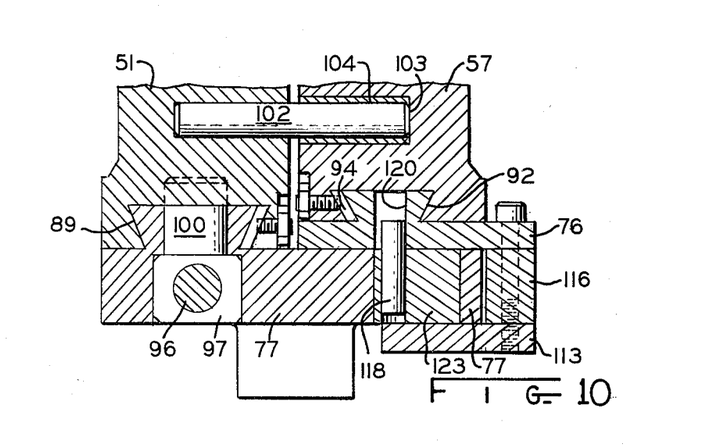
FIG. 10 is a view taken in the direction of arrows 10—10 in FIG. 4.

With particular reference to FIG. 10, it will be noted that a dowel or pin 102 is press-fit into a hole in form part 45 and slidably retained in a bushing 104 that is in turn pressed into a hole 103 formed in the part 57. The bushing 104 and dowel 102 are free to telescope relative one to another so that, form parts 45 and 57 (as viewed in FIG. 10 for example) are free to move laterally away from and toward one another. However, dowel 102 constrains part 57 to slide along track 92 whenever part 45 is being moved along track 89.

Referring now to FIGS. 4–11, the slide plate 76 is movable only along the direction line of arrow 78. The reason for this is that a pair of transversely extending slots 106, 107 are formed in the base plate 77; bushings 108, 109 are constrained to move within slots 106, 107 only in the direction of arrow 78; and bushings 108, 109 trap the shanks of screws 111, 112 which fasten together the slide plate 76 and a back plate 113. The slide plate 76 and back plate 113 are also fastened together and held together by three screws 114, the desired spatial relationship between plates 76 and 113 being maintained by a spacer bar 116. Movement of the back plate 113 and slide plate 76 is accomplished by driving a pair of pins 117, 118 along the slots 119, 120 in slide plate 76 and a slot 121 in the back plate 113.

The pins 117, 118 are moved in the direction of arrows 79 when the adjusting screw 122 is turned because screw 122 forces a slide bar 123 to move (in the direction of arrow 79) along a slot 124 that is formed in the base plate 77. The pins 117, 118 are pressed into the slide bar 123 and are constrained to move in the direction of arrows 79. However, since the slide plate 76 and back plate 113 are constrained to move only in the direction or arrow 78, the pins 117, 118 interact with the walls of disposed slots 119, 120, 121 and cam the slide plate 76 and back plate 113 in the direction of arrow 78.

Thus, when adjusting screw 122 is turned, slide bar 123 will move in the direction of arrow 79 in slot 124, and form part 57 will slide, relative to pin 102, in the direction of arrow 78. One limit of travel for part 5, is determined by the stop screw 82 which acts against the spacer bar 116. Thus, screw 82 establishes one limit of travel by spacer bar 116, slide plate 76, and form part 57. If it is assumed that adjusting screw 122 is provided with a right-hand thread, clockwise adjustment of screw 122 (as viewed in FIG. 6) will cause the slide bar 123 to move toward the head of screw 122 in FIG. 4. This movement causes spacer bar 116 to move toward engagement with the stop screw 82. On the other hand, turning of adjusting screw 122 in a counterclockwise direction (as viewed in FIG. 6) will cause slide bar 123 to move pins 118, 117 to the relative position thereof in slots 119, 120 shown in FIG. 4; and slide plate 76 and spacer bar 116 will tend to move toward the left (as viewd in FIG. 6).

Figure 4:
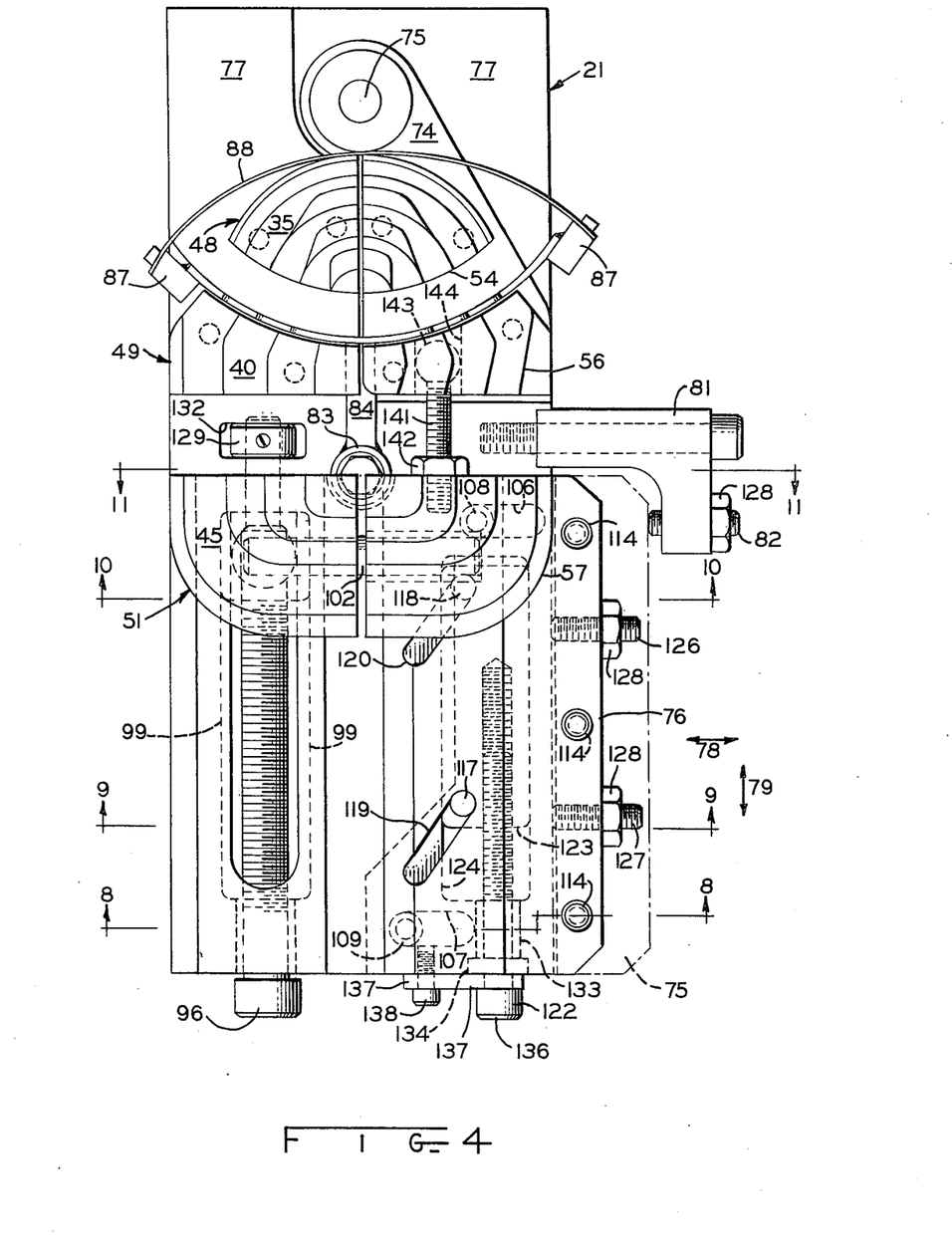
FIG. 4 is a bottom plan view of the winding turn formation means of FIG. 2 and the pusher of FIG. 3 when in assembled relationship.
Figure 6:
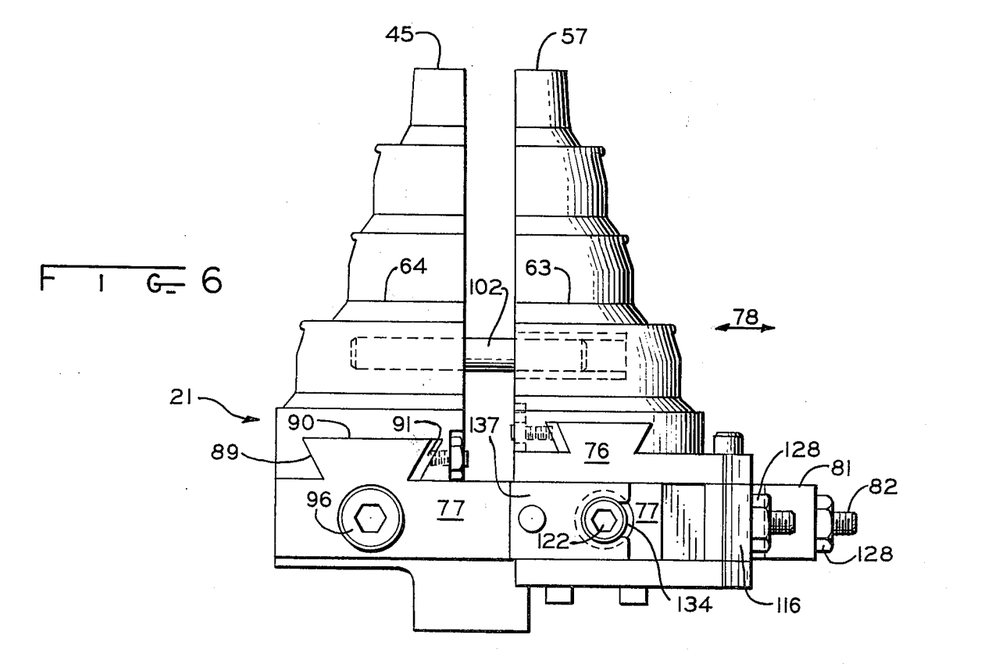
FIG. 6 is an end elevation of the structure shown in FIGS. 4 and 5.
Figure 9:
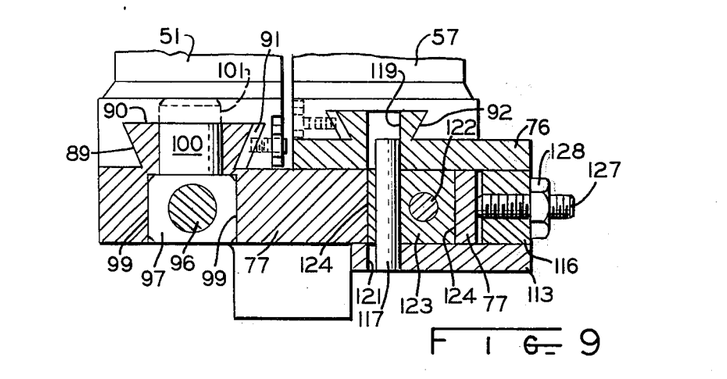
FIG. 9 is a view taken in the direction of arrows 9—9 in FIG. 4.

Stop means are provided to limit movement of part 57 toward the left in FIG. 6 and such stop means are in the form of a pair of screws 126, 127, which are threaded through spacer bar 116 so that the ends thereof will bear against the base plate 77. FIGS. 9 and 4 best illustrate this interrelationship and the jamming action that is provided when screw 127 bears against the base plate 77. Lock nuts 128 are provided to lock the adjustment of stopping screws 82, 126 and 127.

Adjusting screw 122 and adjusting screw 96 are both prevented from being inadvertently disassembled from the coil former assembly 21, but different means are utilized in each case. For example, (with reference to FIGS. 4, 5, and 7) the end 128 of adjusting screw 96 is provided with a reduced diameter portion which receives a locking collar 129 that is retained on the end 128 of the screw by means of a set screw 131 or any other suitable means. The collar 129 is trapped in a slot 132 formed in the base plate 77.

Now having reference to the adjusting screw 122, it is noted that a counter-bored hole 133 is formed in base plate 177. A bushing is pressed into hole 133 and provides a bearing support for screw 122. Brazed (or attached by any other suitable means) to the screw 122 is a collar or washer 134 which is received in the counter sunk portion of the hole 133. The collar 134 and head 136 of the screw 122 bound a reduced diameter portion of the screw body 122. Interposed between the collar 134 and head 136 of screw 122 is a keeper 137 (see FIGS. 4, 7, and 6). The keeper 137 is fastened to the base plate 77 by means of screw 138. The keeper 137 then prevents the screw 122 from moving axially relative to the base plate 77.

Figures 11, 12, 14:
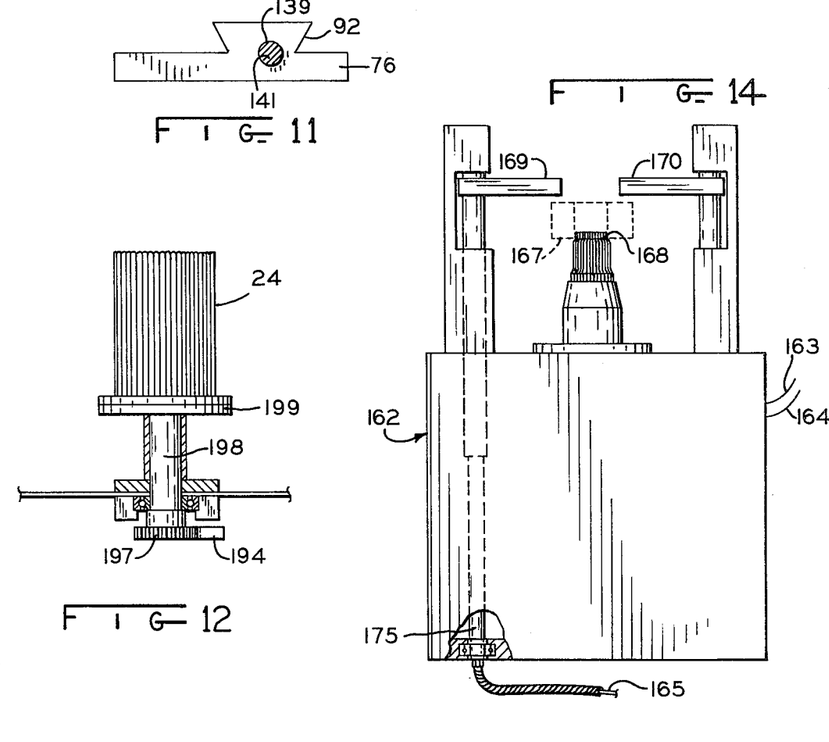
FIG. 11 is an end view of one component part of the structure shown in FIG. 4.
FIG. 12 is an elevation, with parts removed and parts broken away, of a winding turn receiving mechanism shown in FIG. 1.
FIG. 14 is an elevation, with parts removed and parts broken away, of coil insertion apparatus embodying inventive features of ours and useful in describing aspects of one of our inventive methods.

Referring now to FIGS. 4 and 11, it will be noted that one end of the slide plate 76 is provided with a threaded or trapped hole 139 which threadably receives a stud 141. The stud 141 is threaded into hole 139 and a lock nut is then drawn down on the stud to lock the stud 141 in the slide plate 76.

Since the stud 141 is fixed to slide plate 76, the stud 141 is movable only along the line of direction of arrow 78. Thus, when slide plate 76 is adjusted to its two extreme positions (so that coils of either odd or even span will be formed) the stud 141 also travels between two predetermined positions. As the stud 141 moves in this fashion, the ball head 143 of the stud 141 slides along a hole 144 in form part 56 and cause form part 56 to move and remain in the two extreme positions thereof discussed hereinabove in connection with FIG. 2. The form part 56 is fastened by means of pins and screws to the swing plate 76 and, thus, is constrained to move in an arc about the center of pivot pin 75. This movement of form part 56 thus moves the swing plate 74 to two different predetermined positions. Form part 54 is thus also constrained to move to the two different predetermined positions thereof (as discussed hereinabove) by the swing plate 74, because form part 54 is fastened to swing plate 74. The form parts 35, 40, as previously indicated remain stationary at all times and are fastened to the base plate 77 by means of screws and pins. In the case of the form part 35, screws 146 and 147 and pin 150 are used for this purpose (see FIG. 7). On the other hand screws 148, 149 and pins 152, 153 are used to fix form part 40 to the base plate 77.

Figure 5:
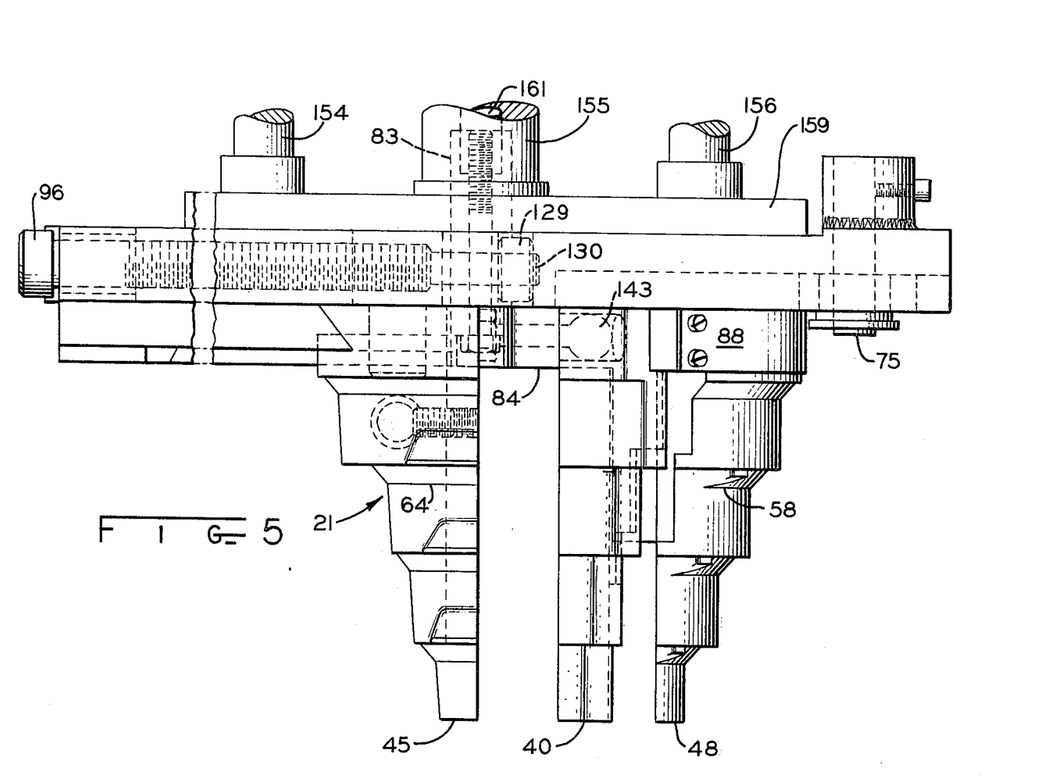
FIG. 5 is a side elevation of the structure shown in FIG. 4.
Figure 7:
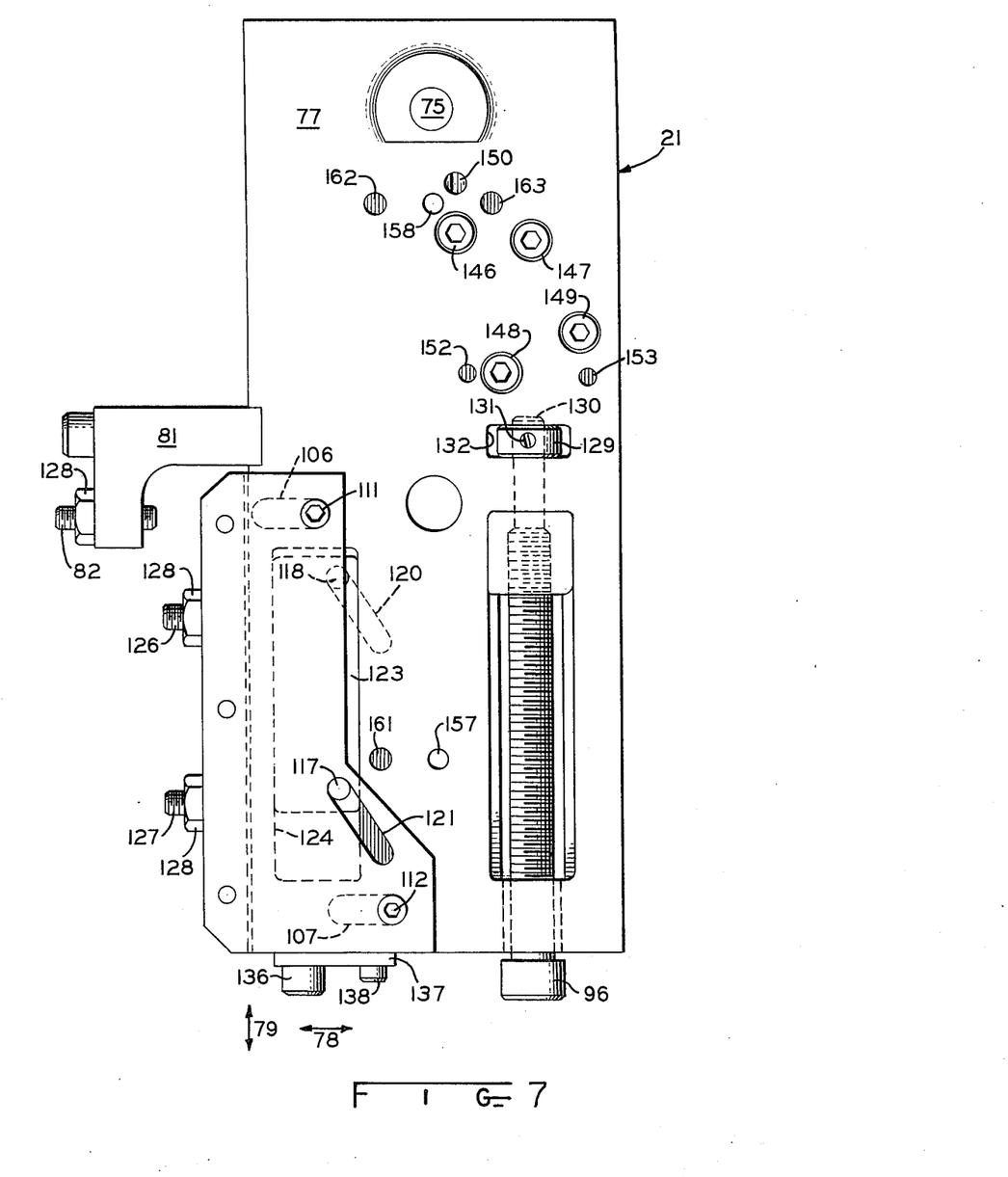
FIG. 7 is a plan view, with parts removed, of the structure shown in FIGS. 5 and 6.
Figure 8:
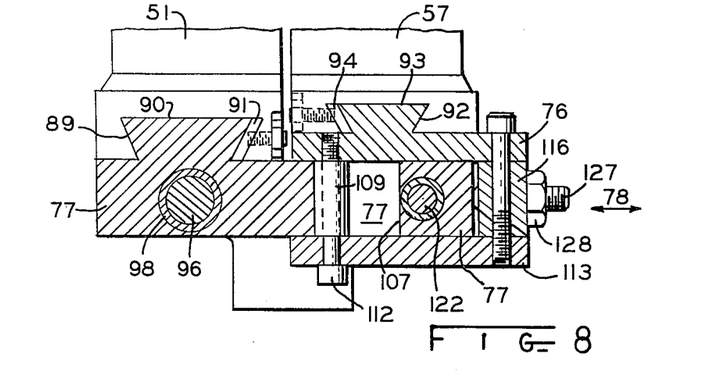
FIG. 8 is a view taken in the direction of arrows 8—8 in FIG. 4.

With reference now to FIGS. 5 and 7, structure is there shown by which the assembly 21 is fastened into the winding apparatus 20. This structure includes elements 154, 155, and 156. These same elements are not shown in FIG. 7 but the relationship thereof to the base plate 77 (as viewed in FIG. 7) will now be pointed out. The element or pin 154 is attached to a plate 159 which carries a pin that is receivable in the hole 157 of base plate 77. Similarly, rod 156 is attached to plate 159 and another pin is received in pin receiving hole 158 of the base plate 77. Not shown screws fasten the plate 159 to the base plate 77 and such screws are received in the threaded mounting holes 161, 162 and 163 of base plate 77. Thus, base plate 77 is firmly attached, relative to the rods 154 and 156, by means of the mounting plate 159. As will be understood by persons skilled in the art, a pusher actuating rod 161 extends along element 155 so that the pusher assembly 55 of FIG. 3 may be actuated.

When the apparatus 21 is in use, it may be quickly setup to establish winding turns having a size or length that will be useable with a core having a stack height within a predetermined or preselected range. This of course may be accomplished by manually (for example with plyers, or a wrench) adjusting the screw 96 and moving the form parts 45 and 57 in the direction of arrow 79. On the other hand, the apparatus 21 may be quickly set-up to develop winding turns that will be of either even or odd span. This set-up is effected by adjusting the screw 122 so as to move slide plate 76 to one of the two extreme positions thereof (as determined by stop screws 82, 126 and 127 respectively). This of course moves the form parts 56, 57, and 54 to the extreme positions thereof that have previously been discussed in conjunction with FIG. 2.

Considering together now the apparatus of FIG. 1, the just completed detailed description of FIGS. 2-11, and the illustrations contained in FIGS. 12-18, an entire system now will be discussed which may be utilized to practice one of our preferred methods.

With reference first to FIG. 14, it is first noted that coil placing apparatus 162 is shown which may be substantially the same as the apparatus of our co-pending application Ser. No. 276,789 (now U.S. Pat. No. 3,829,953) or which may be substantially similar to the apparatus in Smith U.S. Pat. No. 3,698,063. Essentially only two modifications would be made in the apparatus of the Smith patent or the apparatus of our co-pending application in order for the apparatus of those reference disclosures to be useable as the apparatus 162 described herein. Those two changes would be, in effect, to provide an interlock mechanism so that any adjustment in the apparatus 162 that is made to compensate for changes in the axial length or height of cores can not be made until an appropriate signal or voltage appears on the leads 163, 164. In the case of our U.S. Pat. No. 3,829,953 the leads 163 and 164 may be the power leads to the apparatus which, when disconnected, completely disable the apparatus. The other change that would be made in the apparatus of our U.S. Pat. No. 3,829,953 would be to provide a mechanical power take-off that is used to adjust screw 96 in assembly 21. For example, a flexible drive cable 165 (for example, like an automotive speedometer cable) is connected to the shaft 175 in apparatus 162. This shaft 175 corresponds, for example, to the shaft denoted by reference numeral 247 in FIG. 17 of our co-pending and allowed application. Alternatively, if apparatus as shown in the Smith patent were to be used, the cable 163 would preferably be connected to the actuator member 38 that is shown, for example, in FIG. 2 of the Smith patent.

Screw 96 and threaded members driven by shaft 175 would be selected to have leads so that a desired linear relationship between adjustments in apparatus 162 and apparatus 20 may be maintained.

The apparatus 162 of FIG. 14 and the apparatus 20 of FIG. 1 are interdependently related with one another by means of the flexible cable 165 and any suitable control 166. A desired sequence of operation that may be followed to condition the apparatus 162 for use with a core having a given axial length (sometimes referred to as core stack height), and to interdependently condition the winding turn formation means or assembly 21 of the apparatus 20 now will be described.

Initially, when it is desired to set-up or adjust the apparatus 20 and the apparatus 162 so that windings may be formed for a core of a given stack height and then injected into such core, a core such as the core 167 (see FIG. 18) will be placed upon the injection tooling head 168 of the apparatus 162. Thereafter, the clamping arms 169, 170 are moved downwardly (as viewed in FIG. 14) into engagement with the face 169 of the core 167. It should be noted that the final actual position of the arms 170, 169 will depend on the actual height of the core 167. It further should be noted that the core 167 could be of various heights (e.g., it could have a height as represented by full lines in FIG. 18 or any other height up to and including a maximum core height represented by the dotted line illustration of FIG. 18). Still referring to FIG. 14, the movement of clamping arms 170, 169, during a set-up operation, will condition the apparatus 162 to effect various increments of motion and travel of parts therein, all as disclosed in our abovereferenced U.S. Pat. No. 3,829,953. Teachings of other approaches are set out in the referenced Smith patent and reference again is made to such patent and our U.S. Pat. No. 3,829,953 for details therein. Those details do include, among other things, wedge making, placing, and so forth.

Figures 15, 16, 17, 18:
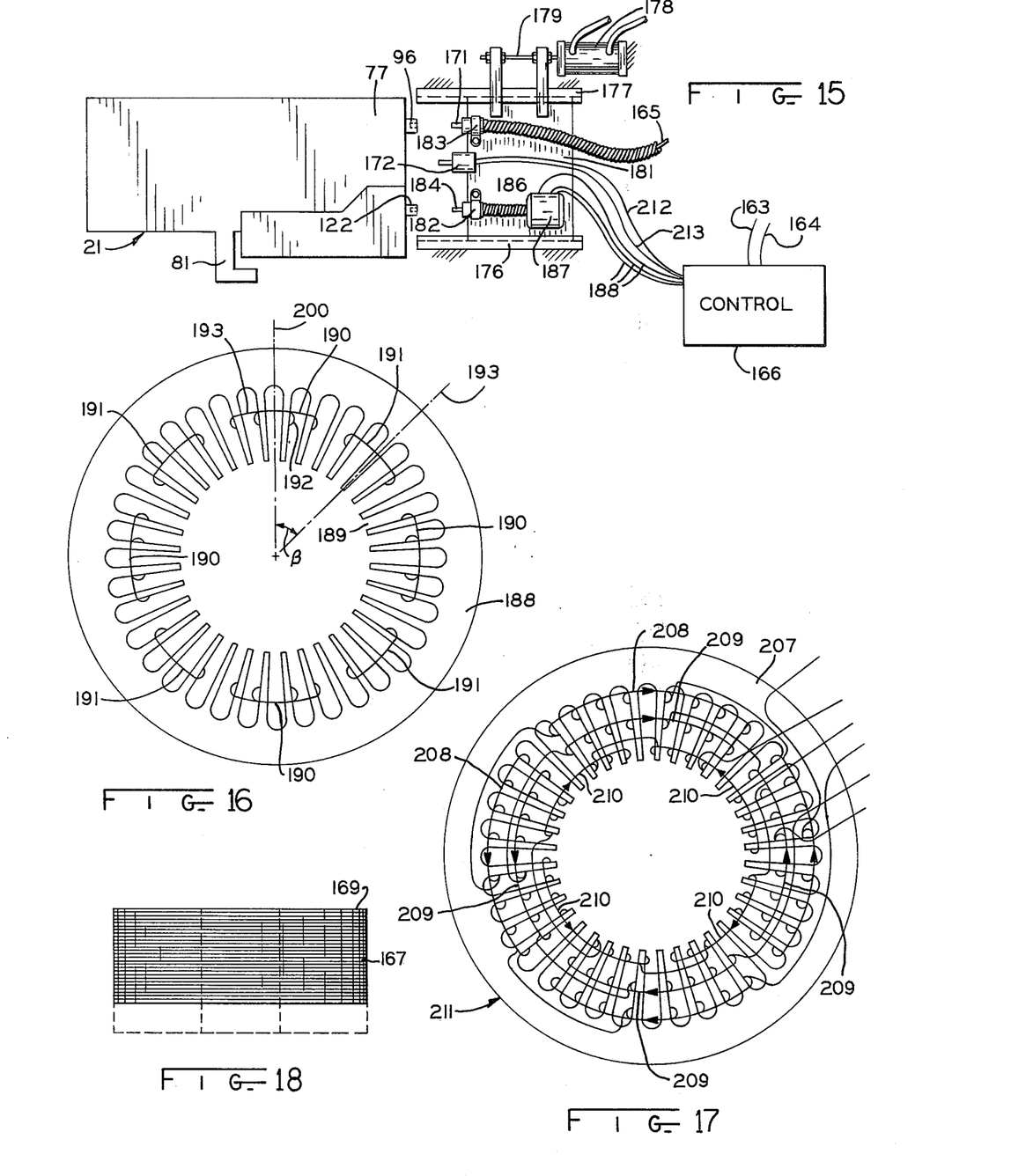
FIG. 15 illustrates, somewhat schematically, means for selectively adjusting: some parts of the apparatus of FIG. 1 interdependently with the adjusting or set-up of the apparatus of FIG. 14; and some parts of the apparatus of FIG. 1 independently of the apparatus of FIG. 14, but in response to any suitable manual or automatic control scheme.
FIG. 16 is presented as a schematic view of one dynamoelectric machine winding arrangement that might be specified which would require the formation of both odd span and even span winding turns.
FIG. 17 is a schematic plan view of another dynamoelectric machine stator core winding arrangement that is presented for purposes of discussion.
FIG. 18 is a side view representation of slotted stator cores for electric motors having actual axial heights or lenghts within a given range, it being noted that each of FIGS. 16, 17, and 18 are herein presented for purposes of illustration and discussion and that no representation is made as to the actual existence of dynamoelectric machines or cores therefor that would correspond exactly to the schematic illustrations of these three drawing figures.

Before the clamping arms 169, 170 are moved into engagement with the face 169 of the core 167, a control (such as the control 166 shown in FIG. 15), the control 166 must enable a signal or voltage to appear on leads 163, 164. With reference to FIG. 15, this signal or voltage does not appear unless the driving end 171 of the cable 165 is engaged in driving relationship with the adjusting screw 96. Assuming that the driving portion 171 of the flexible driving member 165 is engaged with the adjusting screw 96, a limit switch 172 will be closed and indicate such condition (by means of leads 212, 213) to the control 166. In turn, the voltage or signal previously mentioned will be supplied to the apparatus 162 by means of leads 163, 164. Thereafter, as the apparatus 162 is adjusted or set-up to correspond to the actual height of the core 167, the flexible drive member or cable 163 will be driven in a direction to adjust the adjusting screw 96 in a direction corresponding to an increase or decrease in stack height of a core so that the winding turn formation means 21 will be adjusted to provide coils having a length or size that will fit and correspond to the actual stack height of the core 167. Thus, the apparatus 162 and 20 may be substantially continually interdependently conditioned, and adjustments therein are made so that windings for cores of different stack heights may be developed and subsequently placed therein.

With reference now to FIGS. 15 and 1, a pair of guide bars or tracks 176, 177 are fastened to the frame of apparatus 20 in a position that actually is more remote from the assembly 21 than would be indicated by the representation of FIG. 15. This is because it is necessary that the tracks 176, 177 be positioned so that they will not interfere with, or be in the path of, movement of the flyer arm 23. Also fastened to the frame of apparatus 20 is a fluid powered cylinder 178 that has the rod 179 thereof connected to a movable member or support plate 181. The plate 181 is supported for movement by and on the tracks 176, 177.

The movable plate 181 has mounted thereto the limit switch 172 (a button or movable portion thereof engages the base plate 77 of assembly 21), and plate 181 also carries brackets 182, 183. The bracket 183 holds the drive end 171 of flexible drive cable 165, while bracket 182 holds the end of a reversible motor 187. Motor 187 may be pneumatic, electric, or any other type.

The drive end 184 of a drive member 186 is powered by the motor 187. Motor 187 is energized whenever it is desired to rotate adjusting screw 122 so as to change the winding forms to provide forcoils that are to be wound of odd or even spans. The motor 187 is selected so that it will have sufficient power to move screw 122 in either a clockwise or counterclockwise direction until either stop screw 82 is engaged by spacer bar 116 or until the stop screws 127, and 126 engage the base plate 77. When this condition occurs, the motor 187 will stall and remain stalled until it is de-energized. Accordingly, the motor 187 is also selected to be able to withstand stalled conditions for predetermineable periods of time without damage to the motor. Whether motor 187 is to be energized or not, and the direction of rotation of motor 187 during such energization is determined by the control 166. It is noted that motor 187 is not energized until limit switch 172 has provided a signal via leads 212, 213 that indicates that the drive member 184 is properly positioned in driving relationship to the adjusting screw 122.

Conductors in the form of three electrical leads 188 interconnect the motor 187 and the control 166. However, it will be understood that control 166 may be arranged so that it will energize power relays which in turn energize appropriate power leads for motor 187 when motor 187 is selected to be a reversible electric motor. On the other hand, signal voltages may be supplied from control 166 to a bank of pneumatic or hydraulic valves which then would selectively connect a high pressure fluid to the motor 187 when motor 187 is of the fluid type.

It will be understood that the particular form and design of control 166 is not critical to carrying out the objects of the present invention. For example, the control 166 may be part of the control panel of the apparatus 20, or the control panel of any other commercially available winding apparatus. In this case, a two position toggle switch may be provided which will determine the direction of rotation of motor 187 and thus determine whether even or odd span coils are to be wound. Energization of motor 187 would be effected only after another button or switch was actuated to power cylinder 178 so as to advance plate 181, close limit switch 172, and thus indicate the proper positioning of driving member 184 in driving relationship with the adjusting screw 122. The motor 187 would be driven for a sufficient amount of time to insure that the coil forming parts of the form assembly 21 were moved to their desired and intended relative positions, or at least until motor 187 stalled. If it is preferred to avoid stalling of motor 187 and yet insure that the form assembly 21 is properly adjusted, any suitable slip clutch device or driving arrangement may be provided so that driving member 184 is driven through a slip clutch. The clutch then would slip, and motor 187 would not stall, when screw 122 is adjusted to its limit in either direction.

Control 166 may, when desired, be of a type commercially available where printed card, punched card or tape, or other suitable instructions could be fed into the control. These instructions would include the desired information such as number of turns per coil, number of coils per pole, amount of index of the tools 24 between coil groups, odd or even span and so forth. Again, the description of control 166 is provided only for the purpose of providing a teaching of how applicants' invention may be put into practice.

With reference now to FIG. 16, it will be noted that a motor stator core 188 has been shown which is provided with 36 uniformly spaced slots 189. These slots contain side portions of winding turns that comprise two different distinct coil groups. For example, four coil groups 190 are shown, and four coil groups 191 are shown. For ease of illustration, the coil groups 190 have been illustrated as including two coils 192, 193. On the other hand, the coil group 191 has been illustrated as including only a single coil. Moreover, the coils within each coil group may be composed of whatever number of turns desired for a desired motor performance. It will be noted, however, that all of the coils within the coil groups 191 will be of odd span whereas all of the coils within the coil group 190 will be of even span. Thus, during operation of the apparatus 20 for sequentially developing the coil groups 190 and 191, the control 166 and motor 187 will come into play after each coil group is completed.

For example, after one coil group 190 is completely formed and shed into the tools of magazine 24, drive plate 181 advances, motor 187 is energized to turn adjusting screw 122 so that coils of odd span may be formed, and motor drive plate 181 then retracts. Thereafter, a coil group 191 is formed and shed into magazine 24. After a coil group 191 has been formed and shed into the magazine 24, the motor 187 is once again energized (after cylinder 178 has been energized) to turn adjusting screw 122 so that even span coils may again be formed.

Figure 13:
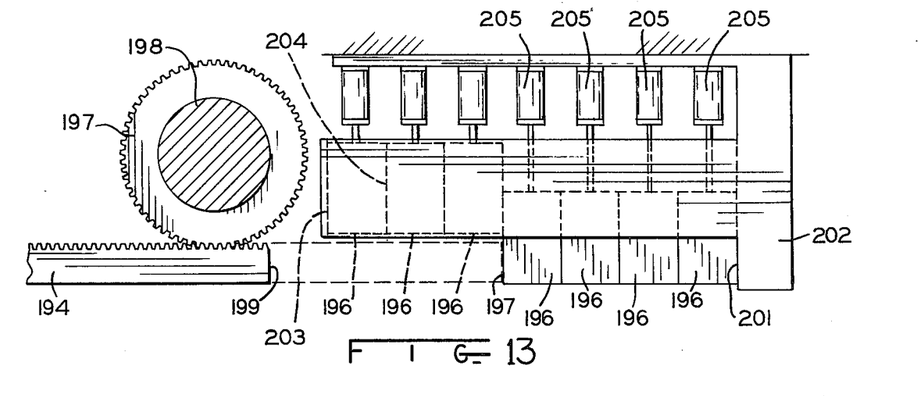
FIG. 13 is a somewhat schematic view of an indexing control approach for the mechanism of FIG. 12.

It should be noted that after a coil group 190 has been formed and shed into the magazine 24, the magazine 24 will be indexed a desired mechanical angle so that the next coil group 191 will be shed into the magazine 24 in spaced relation to the coil group 190 such that the angle between adjacent coil groups, after placement on core 188, will correspond to the angle beta between the polar axes 192 and 193 of adjacent coil groups 190, 191 (as revealed in FIG. 16). This type of index is readily accomplished with the apparatus 20, and FIGS. 12 and 13 illustrate one manner in which this type of index may be accomplished. After a coil group 190 has been shed into magazine 24, the magazine 24 retracts, relatively speaking, from winding form assembly 21 and the control 166 actuates any suitable actuating member that rotates magazine 24 through the desired number of blade units or mechanical angle. For example, a hydraulic or pneumatic cylinder which has a rack 194 fastened to the rod thereof may engage and drive a gear that rotates the magazine. With reference to FIG. 13, the rack 194 can advance until it engages the face of a stop bar 196 that has been moved into the path of travel of the rack 194, all under the control of control 166. It will be understood that the rack 194 may engage gear 197 directly as shown in FIG. 13 (so as to move it in both clockwise or counterclockwise fashion); or the rack may be arranged to drive the gear 197 in one direction only and then ratchet to a returned neutral position. Assuming the latter to be the case, and assuming that four stop bars 196 are positioned as shown by solid lines in FIG. 13, the rack 194 will advance until it engages the face 197 of a stop block. Index of magazine 24 will take place because the gear 197 is fastened to a shaft 198 that turns the supporting base 199 on which the magazine 24 is mounted. Thereafter, when rack 194 returns to its initial or neutral position, corresponding movement of gear 197 will not take place because it will not be in engagement with rack 194 with the gear 197 (or because of a ratchet arrangement).

In the event that it were desired to wind a number of coil groups 190 but not wind coil groups 191, it would be necessary to advance the gear 197 (after each successive coil group 190 had been formed) an angle equal to two beta. In this case, additional stop blocks 196 would be moved to their retracted position, and during each indexing period of magazine 24, the end face 199 of rack 194 would be free to travel until it engaged the face 201 of the reaction frame 202.

It will be understood that the structure illustrated in FIGS. 12 and 13 are schematic representations that are presently believed to be one permissible mode of carrying out applicants' invention. However, it should be understood that, instead of providing a number of movable stop blocks 196 (the position of each of which is controlled by control 166) it may be desirable to provide a different kind of mechanism having a surface which will limit the movement of rack 194. This mechanism could be, for example, a rotatable cam or movable wedge block which would limit the travel of rack 194 during index of magazine 24. Then, by controlling the angular position of such cam (or axial position of a wedge) with the control 166, the angle through which magazine 24 is to be indexed may be readily controlled. It would be preferred, however, in any event, to provide such a stopping mechanism in a manner so that a structure of adequate mechanical strength is provided to avoid becoming damaged after a large number of cycles of apparatus 20.

In our preferred mode of using the mechanisms of FIGS. 12 and 13, the rack 194 always engages gear 197, and advances a desired amount after each coil group has been shed into magazine 24. When used in this manner, one full stroke of rack 194 effects 360° of rotation of the magazine 24. When this rotation is to be in the form of eight equal increments or indexes, a first increment of rotation of magazine 24 is effected by bringing the rack 194 into engagement with the end face 203 of a stop 196. Subsequent indexes would be effected by sequentially retracting the stop blocks 196 and advancing the rack 194 into engagement with the end face (e.g., end face 204) of the next stop block 196. When the advance of rack 194 is controllable in eight equal increments of travel and a complete stroke of rack 194 corresponds to an index of 360°, each increment of advance of the rack 194 would cause index of magazine 24 through a mechanical angle that would be equal to 45°. It thus will be understood that merely by selecting the size of blocks 204 and the number of such individually movable blocks 204 (and of course controllably actuating solenoids or cylinders 205 used therewith) magazine 24 may be indexed in substantially whatever angular increment that might be desired, all under the programmed control of control 166. At the end of any given winding cycle, rack 194 would return to the position thereof shown in FIG. 13 and thus also return gear 197 and the support for magazine 24 to the initial positions thereof.

It is again emphasized that the particular manner in which the apparatus 20 is programmed and controlled so as to control the sequential indexing movement of magazine 24 may be modified in any desired manner, and the representation of FIGS. 12 and 13 are provided herein only for teaching purposes rather than for purposes of limitation.

For example, it will be understood that when magazine 24 of FIG. 1 is to be indexed to receive coil groups 190 and 191 (as shown in FIG. 16) as they are being shed from the assembly 21 (as shown in FIG. 2); the angular extent of index of magazine 24 will be a first amount after a coil group 190 has been formed and a second amount after a coil group 191 has been formed. The sum of this first amount and second amount would, however, be equal to 90 mechanical degrees.

This is best understood by thoroughly considering FIG. 2.

As clearly revealed in FIG. 2, winding turn receiving means (in the form of blades 52) establish a plurality of wire receiving gaps that open along a predetermined arcuate (e.g., circular) path having a center of curvature disposed at or along the center of the magazine 24 of FIG. 1. The assembly 21 is controlled so that turns may be formed therearound that intersect different lengths or arcuate spans of such path. When the assembly 21 is set for an "odd span", the intercepted span or part of such path includes an odd number of blades 52; and when the assembly 21 is set for an even span, the intercepted span of such path includes an even number of blades 52.

FIG. 2 also clearly reveals that different winding surfaces are provided on assembly 21 so that different sizes of concentric (relative to one another) coils may be formed thereabout. It will be noted that for one set-up condition, such coils may be of an even span and thus be generated or formed to interfit in spaced apart pairs of gaps that define therebetween a first even arcuate path span that extends along (or includes) an even number of blades 52. For an odd span set-up condition, a different, and odd arcuate path span will lie between the gap pair which are to receive any odd span coil that is established by the then active contour (i.e., forming surfaces) of the assembly 21.

With the structure of FIG. 2 positioned as shown by solid lines; a coil group 190 will be formed by shedding spaced apart portions of the turns of an inner coil into the gaps between blades 68, 69 and blades 70, 71, respectively. Spaced apart portions of the turns of the outer coil then will be shed into the gaps between blades 67, 68 and blades 71, 72, respectively.

Thereafter, magazine 24 and parts of assembly 21 would be relatively moved; with swing plate 74 moving to its dotted line position as shown in FIG. 2, and magazine 24 indexing so that blade 73 would move to the relative position previously occupied by blade 69 (this assumes of course a clockwise index of blades 52 relative to assembly 21 as viewed in FIG 2). With the assembly 21 then retracted, spaced apart portions of the turns forming the single coil of a coil group 191 will be shed into the gaps between blades 72, 73 and blades 300, 301, respectively. Thereafter, swing plate 74 will move to its solid line position, and magazine 24 will index until blade 302 moves to the position last occupied by blade 72 (and initially occupied by blade 68). Thus, during index of magazine 24 after a coil group 190 has been formed, blade 73 will move "four blade units"; and after a coil group 191 has been formed, balde 302 will move "five blade units". If the blades of magazine 24 are applied to establish coil groups that are to be placed into the slots of a stator having 36 uniformly spaced slots, one "blade unit" will be equal to 10 mechanical degrees. Thus, magazine 24 will index 40 mechanical degrees after a coil group 190 is formed, and 50 mechanical degrees after a coil group 191 has been formed.

Thus, to produce coil groups 190, 191, the structure of FIG. 13 would be modified so that rack 194 can advance in proper increments that would cause gear 197 (and thus magazine 24) to index, sequentially, 40 mechanical degrees and 50 mechanical degrees. Such modification could be accomplished, for example, by providing a sufficient number of devices 205 and blocks 196 so that retraction of each block would permit ten degrees of index, and retraction of all blocks would permit a total index of 360°.

Turning now to FIG. 17, another example of how our invention may be put into use will now be presented. In FIG. 17 we have shown a stator core 207 which is provided with four first coil groups 208 of main windings, four additional coil groups 209 of main windings, and four coil groups 210 of start windings. The coil groups 208 and 209 may be wound and then placed simultaneously, the main windings being arranged as shown primarily to permit energization from two different voltages. It will be noted that the coil groups 208 and 209 are all of even span whereas the coil groups 210 are made up of odd span coils.

By utilizing the present invention, the benefits of machine winding and machine placement of all such coil groups may now be realized. For example, the apparatus 262 of FIG. 14 may be adjusted to correspond to a stack height that is the actual height or length of the core 207. This of course effects a corresponding set up change in the apparatus 20. Thereafter, with the control 166 programmed for the production of coil groups 208 and 209, the coil groups 208 and 209 may be wound and shed into the magazine 24. Thereafter, the coil groups 209, 208 are transferred from magazine 24 into the tools 168 of the apparatus 162. After a desired number of cores have coils groups 209, 208 placed therein, start winding material will be threaded into apparatus 20, control 166 will be programmed to produce coil groups 210, and coil groups 210 then will be wound and placed in the cores 207.

In view of the foregoing, it will be seen that we have provided new and improved methods whereby the relative position of winding turn size determining means in winding turn apparatus may be adjusted by gauging the actual height of the core having a height within a predetermined range of stack heights while using a gauging device having at least two relatively movable members. In the preferred approach, we cause relative movement between the at least two members of the gauging device and relatively move at least two parts of the winding turn size determining means an amount corresponding to the relative movement of the at least two members of the apparatus used to gauge the core. Coil turn placing apparatus may include parts that form the core gauging device and coil turn size determining means of a winding apparatus may be adjusted in response to adjustment of two relatively movable members of the coil placing apparatus. It also is to be expressly understood that the apparatus embodying our invention may be utilized where manual adjustments are to be made so as to adjust the span of winding turn size determining means.

While in accordance with the Patent Statutes, we have described what at present are considered to be preferred and alternate embodiments of the invention, and preferred modes of practicing our invention, it will be obvious to those skilled in the art that numerous changes and modifications may be made therein without departing from the invention. Accordingly, it is aimed in the appended claims to cover all such equivalent variations as fall within the true spirit and scope of our invention.

What we claim as new and desire to secure by Letters Patent of the United States is:

1. The method of interdependently conditioning winding apparatus useful for developing dynamoelectric machine winding coils, and coil placing apparatus for placing wound dynamoelectric machine winding coils in axially extending slots of a magnetic core, the method comprising the steps: positioning a motion transmitting member in engagement with a portion of a winding turn size determining mechanism that is operative to determine the size of winding turns developed by the winding apparatus; adjusting coil placing apparatus for a predetermined mode of operation in connection with placing wound coils in axially extending slots of a given magnetic core having a given axial length within a range of axial lengths by moving at least one part of the coil placing apparatus relative to another part of the coil placing apparatus; and adjusting the size determining mechanism, so that winding turns will be developed therewith having a size corresponding to the given axial length of the given magnetic core, by moving the motion transmitting member an amount determined by the amount of relative movement of the one part and the another part of the coil placing apparatus and thereby adjusting the portion of the winding apparatus engaged by the motion transmitting member.

2. The method of claim 1 wherein the size determining mechanism includes at least two parts with at least one part being movable relative to the other; and wherein adjusting the size determining mechanism includes moving such at least one part while adjusting the portion of the winding turn size determining mechanism engaged by the motion transmitting member.

3. A method of adjusting the relative position of winding turn size determining means in winding apparatus, the method comprising: operatively interconnecting at least one part of the turn size determining means of the winding apparatus with another apparatus having at least two relatively movable members, and gauging the actual height of a core having a height within a predetermined range of stack heights by causing relative movement between the at least two members of the another apparatus; automatically relatively moving at least two parts of the winding turn size determining means an amount corresponding to the relative movement of the at least two members of the another apparatus; and thereafter disabling the operative interconnection of the at least one part of the turn size determining means with the another apparatus.

4. A winding turn developing and winding turn placing system comprising: at least one winding turn placing apparatus; at least one winding turn developing apparatus that is at least partly interdependently conditionable with the at least one winding turn placing apparatus and that includes winding turn size determining means; and means for effecting a set-up change of at least part of the at least one winding turn developing apparatus in response to selective adjustment of the at least one winding turn placing apparatus; said winding turn placing apparatus being selectively adjustable for placing winding turns in axially extending slots of a magnetic core having an actual axial length within a predetermined range of axial lengths, and including at least one mechanism comprising at least two members movable relative to one another during selective adjustment of the winding turn placing apparatus; the winding turn size determining means of the at least one winding turn developing apparatus having at least two parts movable relative to one another thereby to cause changes in the size of developed winding turns; said means for effecting a set-up change including a mechanism for causing relative movement of said at least two parts of the winding turn size determining means in response to relative movement of said at least two members of the winding turn placing apparatus.

5. The system of claim 4 wherein the at least one winding turn developing apparatus includes means for changing the span of winding turns developed therewith.

6. The system of claim 5 wherein the means for changing the span of winding turns includes at least one of said at least two parts and further includes a device for selectively moving said at least one of said at least two parts to first and second predetermined positions.

7. A system comprising at least first and second apparatus: said first apparatus comprising means for developing dynamoelectric machine winding turns, said means for developing including first means for dispensing wire, second means for at least contributing to a corresponding initial size and shape of winding turns, and adjusting means for conditioning said second means so that the corresponding size and shape of winding turns will be in conformity with the actual axial length of at least one magnetic core having an actual axial length within a range of axial lengths; said second apparatus comprising winding turn placing means having at least first and second members movable relative to one another and further comprising adjusting means for setting the actual relative movement of said first and second members to correspond to the actual axial length of at least one magnetic core having an actual axial length within a range of axial lengths; and means for changing the adjusting means in one of said first and second apparatus in response to changes made in the adjusting means in the other one of the first and second apparatus.

8. A winding turn developing system comprising winding turn developing apparatus including winding turn size determining means having at least two parts movable relative to one another, and means for gauging the axial length of a core having an actual axial length within a predetermined range of axial lengths; said means for gauging including at least two relatively movable members; said system including means for at least permitting relative movement between said at least two membrs so that the relative positions thereof will be indicative of the actual length of a gauged core, and also for causing relative movement of said at least two parts of the winding turn size determining means an amount corresponding to relative movement of said at least two members.

9. A winding turn developing system comprising at least one device for gauging the axial height of a stator core having an actual height within a range of axial heights; at least one winding turn developing mechanism that is at least partly interdependently conditionable with the at least one device for gauging that includes winding turn size determining means; and means for effecting a set-up change of at least part of the at least one winding turn developing apparatus in response to selective adjustment of the at least one device for gauging; said device for gauging being selectively adjustable to correspond to the axial height of a stator core having an axial height within a predetermined range of axial heights, and including at least two members movable relative to one another during selective adjustment of the device for gauging; the winding turn size determining means of the at least one winding turn developing mechanism having at least two parts movable relative to one another thereby to cause changes in the size of developed winding turns; said means for effecting a set-up change including a mechanism for causing relative movement of said at least two parts of the winding turn size determining means in response to relative movement of said at least two members of the device for gauging.

10. The system of claim 9 further comprising at least one coil placing apparatus, and wherein the device for gauging comprises a portion of the at least one coil placing apparatus.

11. The system of claim 9 wherein the at least one winding turn developing mechanism includes means for changing the span of winding turns developed therewith.

12. The system of claim 11 wherein the means for changing the span of winding turns includes at least one of said at least two parts and further includes a device for selectively moving said at least one of said at least two parts to first and second predetermined positions.

13. Winding apparatus including means for determining the size and span of winding turns that are movable along a plurality of spaced apart turn receiving gaps established by a plurality of turn receiving members; said means for determining including at least four parts movable relative to one another and arranged in pairs; a first pair of said parts being movable relative to a second pair of said parts in a direction to change the effective size of winding turns developed by the apparatus; and at least one of the second pair of said parts being movable, relative to other parts of said means for determining, to at least two different span determining positions so as to change the span of winding turns formed on said parts; said second pair of said parts establishing regions along an arcuate path for accommodating said turn receiving members when said at least one of the second parts is positioned in either of its at least two different span determining positions.

14. The apparatus of claim 13 wherein at least two parts of said means for determining are movable relative to the other parts of said means for determining so as to change the size of winding turns formed on said parts.

15. The apparatus of claim 13 wherein said means for determining includes a mounting plate; a first one of said parts is supported in a fixed position on said plate; a second one of said parts is supported for movement relative to said plate between first and second predetermined positions; and a third one of said parts is supported for movement in a first direction between first and second predetermined limits of movement, and for movement in a second direction.

16. A method of conditioning winding apparatus having form means for determining the size and span of winding turns for accommodation in wire receiving gaps of winding turn receiving means wherein the gaps establish different locations along an arcuate path, and wherein the means for determining includes at least two form parts mounted so that relative movement thereof may be accomplished so as to change the span of winding turns formed in conjunction with the at least two form parts whereby wire turns of a given general size but of different spans may be formed in conjunction with the at least two form parts and be accommodated in either first or second gap pairs of the turn receiving means that are respectively located so that the arcuate path span between such first gap pair is different from the arcuate path span between such second gap pair by an odd number of gap spacings with such number constituting one or more, the method comprising: selecting a first angular span along the arcuate path for a number of winding turns; moving at least one of the at least two form parts relative to the other of the at least two form parts to first predetermined relatively fixed positions; and developing a plurality of winding turns, having the selected first angular span, in conjunction with the at least two form parts and moving the plurality of winding turns having the selected first angular span along a turn receiving gap pair that establish the first arcuate span along the arcuate path.

17. The method of claim 16 further comprising moving at least one of the at least two form parts relative to the other of the at least two form parts to second predeterminable relatively fixed positions after the plurality of winding turns having the selected first angular span have been developed; and then developing another plurality of winding turns having a second selected angular span different than the first angular span.

18. A method of effecting a set-up change of at least part of a winding turn developing apparatus that is used in a winding turn developing and winding turn placing system wherein the winding turn developing apparatus includes at least two coil form parts that are adjustable relative to one another so that winding turns of different sizes may be developed therearound for cores of different stack heights, the method involving the use of a core height gauging mechanism that is operatively interconnectable with at least one of the at least two coil form parts, said method including the steps of selectively operatively interconnecting and disconnecting the gauging mechanism with at least one of the at least two coil form parts, and also including: positioning a core of a first given stack height adjacent to a core height gauging mechanism; adjusting the core height gauging mechanism to correspond to the given stack height of the core while the gauging mechanism is operatively interconnected with at least one of the at least two coil form parts, and thereby also adjusting the at least two coil form parts so that winding turns for use in a core of the given stack height may be generated therearound; and thereafter disconnecting the gauging mechanism from the at least one of the at least two coil form parts.

19. A method of conditioning winding apparatus for winding at least two successive coil groups of different spans that are accommodated in wire receiving gaps of winding turn receiving means wherein the gaps establish different locations along an arcuate path, the apparatus having at least first and second coil form parts for determining at least the angular span of winding turns with the at least first and second coil form parts being movable relative to one another so as to change the angular span of winding turns formed in conjunction with the at least first and second coil form parts with the result that winding turns of the same general size but of different angular spans are accommodated by first and second pairs of gaps of the turn receiving means that are respectively located so that the angular span between such first gap pair is different from the angular span between such second gap pair, the method comprising: selecting a first angular span along the arcuate path for a number of winding turns; developing at least one coil of a first general size and having turns of the first angular span and accommodating the at least one coil of a first general size in a first pair of gaps that are spaced apart a first angular distance along the arcuate path and thus establish the first angular span; moving at least one of the first and second coil form parts relative to the other of the at least first and second coil form parts to predetermined relatively fixed positions; and developing a plurality of winding turns of the first general size and having a second selected angular span, different from the first angular span by an odd number of gap spacings with such odd number being one or more, about the at least first and second coil parts while the at least first and second coil form parts are retained in the predetermined relatively fixed positions, and accommodating the plurality of winding turns of the first general size and having the second selected angular span in a second pair of gaps that are spaced apart a second angular distance different than the first angular distance and thus establish the second angular span.

20. Apparatus for use in generating, for use in magnetic cores having angularly spaced apart slots therein, winding turns of at least two different coils that have first and second different predetermined angular spans, said apparatus including: at least one turn former assembly comprising at least first and second parts that are relatively movable to first and second relative positions so that a first and second plurality of winding turns having first and second predetermined spans, corresponding respectively to the angular spans between a first and a second predetermiined pair of magnetic core slots, may be generated thereabout; and means for receiving winding turns from said turn former assembly, said means for receiving comprising a plurality of gap establishing members with a first pair of said gap establishing members establishing angularly spaced apart gap locations having a first angular span corresponding to the first predetermined span, and a second pair of said gap establishing members establishing angulary spaced apart gap locations having a second angular span corresponding to the second predetermined span; said at least first and second parts beng movable to second relative positions so that the second plurality of winding turns having a second predetermined span, corresponding to the angular span between the second predetermined pair of magnetic core slots and different than the first predetermined span by an odd number of gap spacings with such number being one or more, may be generated thereabout; the angular span between one of the predetermined pair of magnetic core slots corresponding to the spacing between an odd number of such core slots, and the angular span between the other of the predetermined pair of magnetic core slots corresponding to the spacing between an even number of such core slots.

21. The apparatus of claim 20 wherein said gap establishing members are held in alignment with at least said first and second parts.

* * * * *